(12) United States Patent
Lahijani

(10) Patent No.: US 8,993,695 B2
(45) Date of Patent: Mar. 31, 2015

US008993695B2

(54) MELT-FABRICABLE PERFLUOROPOLYMERS HAVING IMPROVED HEAT AGING PROPERTY

(71) Applicant: E I du Pont de Nemours and Company, Wilmington, DE (US)

(72) Inventor: Jacob Lahijani, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 14/162,027

(22) Filed: Jan. 23, 2014

(65) Prior Publication Data

US 2014/0135463 A1 May 15, 2014

Related U.S. Application Data

(62) Division of application No. 13/193,676, filed on Jul. 29, 2011, now Pat. No. 8,648,147.

(60) Provisional application No. 61/371,267, filed on Aug. 6, 2010.

(51) Int. Cl.
| | | |
|---|---|---|
| C08F 216/14 | (2006.01) | |
| B29C 71/00 | (2006.01) | |
| C08F 6/26 | (2006.01) | |
| C08L 27/18 | (2006.01) | |
| C08F 4/00 | (2006.01) | |
| B29C 71/02 | (2006.01) | |

(52) U.S. Cl.
CPC ....... *C08F 216/1408* (2013.01); *Y10T 428/139* (2015.01); *B29C 71/0063* (2013.01); *B29C 71/02* (2013.01); *C08F 6/26* (2013.01); *C08L 27/18* (2013.01); *C08L 2205/02* (2013.01)
USPC ............................ 526/207; 526/247; 526/250

(58) Field of Classification Search
USPC ......................................... 526/207, 247, 250
See application file for complete search history.

(56) References Cited

U.S. PATENT DOCUMENTS

| | | | |
|---|---|---|---|
| 3,635,926 A | 1/1972 | Gresham et al. | |
| 4,029,865 A | 6/1977 | Varglu et al. | |
| 4,624,990 A | 11/1986 | Lunk et al. | |
| 4,743,658 A | 5/1988 | Imbalzo et al. | |
| 4,859,836 A | 8/1989 | Lunk et al. | |
| 5,317,061 A | 5/1994 | Chu et al. | |
| 5,473,018 A | 12/1995 | Namura et al. | |
| 5,603,999 A | 2/1997 | Namura et al. | |
| 5,677,404 A | 10/1997 | Blair | |
| 5,932,673 A | 8/1999 | Aten et al. | |
| 6,436,533 B1 | 8/2002 | Heffner et al. | |
| 6,465,575 B1 | 10/2002 | Kusano et al. | |
| 6,586,546 B2 * | 7/2003 | Iwasaki et al. ................ | 526/207 |
| 6,649,699 B2 | 11/2003 | Namura | |
| 6,838,545 B2 | 1/2005 | Chapman et al. | |
| 7,030,191 B2 | 4/2006 | Namura | |
| 2007/0106026 A1 | 5/2007 | Namura | |
| 2007/0106027 A1 | 5/2007 | Namura | |
| 2009/0317553 A1 | 12/2009 | Harvey et al. | |
| 2010/0080955 A1 | 4/2010 | Harvey et al. | |
| 2010/0080959 A1 | 4/2010 | Harvey et al. | |

FOREIGN PATENT DOCUMENTS

| | | |
|---|---|---|
| EP | 0612803 A1 | 8/1994 |
| WO | 95/01401 | 1/1995 |
| WO | 02/10487 A2 | 2/2002 |
| WO | 02/10487 A3 | 2/2002 |
| WO | 2011075351 A1 | 6/2011 |

OTHER PUBLICATIONS

L. Rodriguez, Authorized Officer, International Search Report for FL0518PCT, International Application No. PCT/US2011/046692, dated Oct. 7, 2011.
Scigala, R., et al, "Crystallinity of Poly(Tetrafluoroethylene)," Acta Polymerica 40, No. 1, 15-19 (1989).
Ferry, L., et al, "Study of Polytetrafluoroethylene Crystallization," Acta Polymer, 46, 300-306 (1995).
Lee, J-C, et al, "Miscibility and Cocrystallization Behavior of Two Melt-Processable Random Copolymers of Tetrafluoroethylene and Perfluoroalkylvinylether," Polymer 42 (2001) 5453-5461.
Pucciariello, R., et al, "Phase Behavior of Crystalline Blends of Poly(Tetrafluoroethylene) and of Random Fluorinated Copolymers of Tetrafluoroethylene," Journal of Polymer Science: Part B: Polymer Physics, vol. 37, 679-689 (1999), John Wiley & Sons, Inc.
Endo, M., et al, "Miscibility and Crystallization of Polytetrafluoroethylene/Poly(Tetrafluoroethylene-Co-Perfluoropropylvinyl Ether) Blends," Macromol. Rapid Commun. 21, No. 7, 396-400, Wiley-VCH Verlag Gmbh, D-69451 Weinheim 2000.
Runt, J., et al, "Crystalline Homopolymer—Copolymer Blends: Poly(Tetrafluoroethylene)—Poly(Tetrafluoroethylene-Co-Perfluoroalkylvinyl Ether)," Macromolecules 1995, 28, 2781-2786.
Marigo, A., et al, "Annealed Samples of Some Tetrafluoroethylene Perfluorinated Copolymers Studied by Small- and Wide-Angle X-Ray Scattering and Differential Scanning Calorimetry," Macromolecules 1997, 30, 7862-7865.
Endo, M., et al, "Crystallization in Binary Blends of Polytetrafluoroethylene With Perfluorinated Tetrafluoroethylene Copolymer," Polymer Journa, vol. 36, No. 9, pp. 716-727 (2004).
Ebnesajjad, S., "Fluoroplastics, vol. 2: Melt Processible Fluoropolymers the Definitive User's Guide and Databook," Plastics Design Library, A Division of William Andrew Inc., Norwich, NY, p. 6, pp. 125-128 and pp. 133-134 (2003).
Klug, Harold, "X-Ray Diffraction Procedures for Polycrystalline and Amorphous Materials," John Wiley & Sons, Inc., New York, p. 491, (1954).
Lahijani, J., "Downhole Well Communications Cable," FL0517USNA, Unpublished U.S. Appl. No. 13/193,672, filed Jul. 29, 2011, E. I. Du Pont De Nemours and Company.
Lahijani, J., "Improvement in Flex Life of Tetrafluoroethylene/ Perfluoro(Alkyl Vinyl Ether) Copolymer (PFA)," FL0519USNA, Unpublished U.S. Appl. No. 13/193,683, filed Jul. 29, 2011, E. I. Du Pont De Nemours and Company.

\* cited by examiner

*Primary Examiner* — Terressa Boykin
(74) *Attorney, Agent, or Firm* — Edwin Tocker; Keith W. Palmer

(57) ABSTRACT

Heat aging of the composition comprising melt-fabricable tetrafluoroethylene/perfluoro(alkyl vinyl ether) copolymer, the alkyl containing 1 to 5 carbon atoms and melt flowable polytetrafluoroethylene is effective to cause thermal transformation of the composition in the solid state, which is epitaxial co-crystallization of the polymer components of the composition, and other valuable changes, such as increased continuous use temperature.

4 Claims, No Drawings

MELT-FABRICABLE PERFLUOROPOLYMERS HAVING IMPROVED HEAT AGING PROPERTY

FIELD OF INVENTION

This invention relates to increasing the use temperature of tetrafluoroethylene/perfluoro(alkyl vinyl ether) copolymer and to other effects of heat aging.

BACKGROUND OF INVENTION

Continuous use temperature of perfluoropolymers is the highest temperature at which the perfluoropolymer can be used for a long period of time while still retaining substantial strength. The length of time is 6 months and the retention of tensile property means that the loss in this property is 50% as compared to the property prior to exposure to the continuous use heating. This is the meaning of continuous use temperature herein. The tensile testing of the copolymer is done by removal of the copolymer test samples from the oven heated to the test temperature and then carrying out the tensile property measurement at ambient temperature (15-25° C.).

For tetrafluoroethylene/perfluoro(alkyl vinyl ether) copolymer, the continuous use temperature is 260° C., which is far less than the 302° C. to 310° C. melting temperature as disclosed on pp. 6 of S. Ebnesajjad, Fluoroplastics, Vol. 2, Melt Processible Fluoropolymers, The Definitive User's Guide and Databook, published by Plastics Design Library (2003). The copolymer melting temperature is for the highest melting copolymer, introduced in 1972, which is (tetrafluoroethylene/perfluoro(propyl vinyl ether). The melting temperature is the temperature corresponding to the DSC endothermic peak resulting from the phase change of the copolymer from the solid to the liquid state. The temperature that can be withstood by the copolymer is far less than its melting temperature, however, as indicated by the much lower continuous use (service) temperature.

The reduction in tensile property with prolonged heating indicates a deterioration of the integrity of the copolymer. The problem is how to improve the integrity of this copolymer so that it can be used at a temperature greater than its current continuous use temperature, i.e. the copolymer has a higher continuous use temperature.

SUMMARY OF INVENTION

The present invention solves this problem by in one embodiment providing a process comprising heat aging a composition comprising melt-fabricable tetrafluoroethylene/perfluoro(alkyl vinyl ether) copolymer, wherein said perfluoroalkyl contains 1 to 5 carbon atoms, and melt flowable polytetrafluoroethylene, said heat aging being carried out at a temperature greater than 260° C. with said composition being in the solid state. The composition itself is melt fabricable and the polytetrafluoroethylene is melt flowable as will described later herein. Prior to heat aging, the two polymers are blended together.

Surprisingly, the presence of the above-mentioned polytetrafluoroethylene improves the integrity of the copolymer during exposure to this heat aging, enabling the resultant composition to exhibit a continuous use temperature greater than 260° C. This heat aging can also produce surprising changes in crystal structure and properties as will be discussed hereinafter. Most surprising is the solid state thermal transformation of the composition from exhibiting two melting temperatures to exhibiting just one melting temperature, i.e. epitaxial co-crystallization, as will be discussed hereinafter.

One embodiment of heat aging is practiced by heating the composition at a temperature of at least 280° C. or carrying out the heating for at least 4 hours or both. A preferred heat-aging temperature is at least 300° C. The heat aging is preferably effective to result in the composition exhibiting a continuous use temperature of at least 300° C. This means that although the copolymer component by itself has a continuous use temperature of only 260° C., the composition used in the present invention preferably has the much higher continuous use temperature of at least 300° C. The presence of this continuous use temperature is characterized by the composition retaining at least 80% of its original tensile modulus (tensile modulus prior to heat aging), preferably at least 90%, after heating the composition at a temperature of at least 300° C. for 6 months.

Typically, the composition will be fabricated from the molten state into an article, and the article will be used at the high temperature that constitutes the heat aging to reveal such benefit as continuous use temperature of at least 300° C.

The heat aging of the composition according to the present invention provides benefits that manifest themselves in the capability of the composition or article fabricated therefrom being used in high-temperature service for an extended period of time, preferably at least 6 months, such as at temperatures of 280° C. and above, preferably at least 290° C., and most preferably at least 300° C., the composition or article made therefrom exhibiting the tensile modulus performance mentioned above.

According to one embodiment, the heat aging process is effective to reduce the coefficient of friction of said composition. This benefit can be realized at low temperatures such as ambient temperature of 15-25° C. The same is true for the benefit of improved permeation resistance by gas, i.e. the heat aging process is effective to reduce permeation of the composition by one or more of such gases as oxygen and carbon dioxide by at least 50% at ambient temperature. The high tensile modulus contributes to the increased resistance to sagging.

According to another embodiment of the present invention, the manifestation of the benefit of the heat aging process is both at ambient temperatures and higher in the use of the heat aged composition. The heat aging is effective to increase the resistance of said composition to sagging. Preferably, in the process of the present invention, the heat aging is effective to decrease the melt flow rate (MFR) of said composition by at least 25% as compared to the original MFR (prior to heat aging).

In one application, the composition is in the form of tubing and the increased resistance to sagging is manifested by the resistance of the tubing to sagging between tubing supports. Accompanying this resistance to sagging is also increased resistance to ballooning (increased resistance to diameter expansion) upon pressurization within said tubing. This improvement is obtained in comparison with the same tubing made solely from the copolymer used in the composition and with the composition prior to heat aging.

The heat aging at any of the temperatures mentioned above is preferably effective to cause the composition and articles made therefrom to undergo epitaxial co-crystallization (ECC) of the PFA and polytetrafluoroethylene component of the composition and articles made therefrom. The manifestation of ECC is the composition and the article made from the composition exhibiting a single melting temperature brought about by heat aging in the solid state in accordance with the present invention. Melting temperature is the endothermic peak determined by DSC as described under the EXAMPLES, involving the heating up of the DSC sample (of the composition) at a rate of 10° C./min until the sample (composition) to 350° C., at which temperature the sample is in the molten state. U.S. Pat. No. 6,649,699 discloses in Tables 1-5 that PFA/melt flowable PTFE compositions exhibit at least two DSC melting temperatures (two endothermic peaks) corresponding to the individual melting temperatures of the PFA and PTFE components by themselves. This result observed in '699 upon the first exposure of the composition to DSC melting temperature determination has also been observed to exist for the compositions used in the present invention as further described in Example 8. This first exposure to the DSC melting determination is often referred to as "first heat" melting temperature to differentiate from a second exposure to the DSC melting temperature determination, often referred to "second heat" melting temperature, wherein the "first heat" composition is cooled to 200° C. and then reheated to at the rate of 10 C/min to 350° C. to generate a endothermic peak corresponding to the second heat determination of melting temperature. The first heat DSC melting temperature represents the crystallographic state of the sample, which can be melt-extruded pellets of the composition or melt-fabricated articles from the composition. Prior to heat aging, pellets and melt fabricated articles from the composition contain separate crystals primarily of PFA and the PTFE as indicated by the presence of at least two melting temperatures corresponding approximately to the melting temperature of each polymer component.

ECC is the phenomenon of these separate crystals becoming co-crystals such that the DSC first heat melting temperature is a single melting temperature, which is greater than the melting temperature of the PFA, and indicating that the crystals of PFA and melt flowable PTFE have transformed to a different crystalline state, namely co-crystals. ECC results from heat aging of the composition or its article as described above. M. Endo et al, Crystallization in Binary Blends of Polytetrafluoroethylene with Perfluorinated Tetrafluoroethylene Copolymer, Polymer Journal, Vol. 36, No. 9, pp 716-727 (2004) discloses in FIG. 10 that PFA/PTFE blends exhibit a single melting temperature (second heat) suggesting co-crystallization. As disclosed on p. 717, the first heat melt is held at 623° K (350° C.) for one hour before cooling below the melting temperature and reheating the blend to obtain the second heat melting temperature. In other words, co-crystallization was found after the blend was heated in the molten state for one hour before the obtaining the DSC second heat melt temperature.

ECC occurs in the present invention by heat aging at a temperature at which the composition retains its shape and does not flow, indicating that the composition is in the solid state. By retaining its shape is meant that the shape of the melt-fabricated article is discernible after heat aging. This is important because the composition can be and preferably is in the form of an article melt-fabricated from the composition. As such, it is critical that the article remain in the solid state during heat aging, so that the article retains its melt-fabricated shape. Thus, while the heat aging temperature is high according to the present invention, such temperature is not so high that the article melts and flows to lose its original (unaged) shape. It has been found that this shape stability is retained even at heat aging temperatures greater than the melting temperature of the PFA by itself. It is preferred, however, that the heat aging temperature be less than the melting temperature of the lowest melting temperature component of the composition, i.e. less than the melting temperature of the copolymer.

The heat aging process of the present invention is preferably effective to produce one or more other or additional crystallographic changes in the crystal structure of the composition such that it or the article melt molded from the composition, exhibit an increase in crystallinity index by at least 10%. This increase is in comparison with both compositions prior to heat aging and with the copolymer by itself upon being subjected to the same heat aging. Another crystallographic change is improved uniformity in crystal structure of the heat aged composition or article made therefrom characterized by an increase in long period coherence of at least 10%. This improvement is most notable by comparison with the long period coherence for the copolymer by itself upon the same heat aging. A different crystallographic change is the crystal structure of the composition and its article, including lamellae comprising a crystalline layer of the heat-aged composition and an amorphous layer of the heat aged composition, together with the thickness of the crystalline layer being increased by the heat aging, whereby the composition exhibits an increase in long period of at least 25% upon the heat aging. According to a preferred embodiment, the composition or its article exhibits an apparent crystallite size of at least 280 Å, crystallinity index of at least 44, long period of at least 375 Å, and long period coherence of at least 450 Å.

Preferably, the heat aging of the process of the present invention is effective to cause the composition to exhibit an increase in storage modulus of at least 30% at 300° C. when the heat aging is at 315° C. for 7 days as shown in Example 2.

The above mentioned improvements in physical properties obtained by heat aging the composition can exist individually or in any combination in the heat-aged composition and article obtained therefrom. The same is true with respect to the crystallographic changes in the composition and article made therefrom and with respect to the combination of any of the improvements in physical properties with any of the crystallographic changes.

Another embodiment of the present invention is the heat-aged composition made by the heat aging process described above and additionally herein. Typically, the heat aged composition will be in the form of the final article made therefrom, such articles being disclosed hereinafter.

The heat-aged composition can also be described as comprising melt-fabricable tetrafluoroethylene/perfluoro(alkyl vinyl ether) copolymer, wherein said perfluoroalkyl contains 1 to 5 carbon atoms, and melt flowable polytetrafluoroethylene, said heat aged composition exhibiting one or more of the following:

(a) a continuous use temperature of at least 300° C.,
(b) a reduced coefficient of friction,
(c) a reduced permeation to gases by at least 50%,
(d) a decrease in melt flow rate of at least 25% as compared to the melt flow rate of said composition prior to heat aging,
(e) an increase of at least 30% in storage modulus at 300° C.
(f) an increase in thickness of its crystalline layer characterized by an increase in long period of at least 25%,
(g) an increased resistance to sagging and/or ballooning,
(h) improvement in uniformity of crystal structure characterized by an increase in long period coherence of at least 10%,
(i) an increase crystallinity index by at least 10%,
(j) epitaxial co-crystallization.

In terms of certain crystallographic features, the heat-aged composition can be described as comprising melt-fabricable tetrafluoroethylene/perfluoro(alkyl vinyl ether) copolymer, wherein said perfluoroalkyl contains 1 to 5 carbon atoms, and an effective amount of melt flowable polytetrafluoroethylene to provide said heat aged composition with a crystal structure, characterized by one or more of the following: an increase in crystallinity index (i) of at least 10% as compared to said heat-aged composition prior to heat aging, and/or (ii) of at least 10 % greater than the % increase in crystallinity index for said copolymer by itself upon said heat aging. This heat-aged composition can also exhibit uniformity of said crystal structure that is improved by said heat aging, characterized by said heat-aged composition exhibiting an increase in long period coherence that is at least 10% greater than the increase in long period coherence for said copolymer by itself upon said heat aging, Another aspect of the present invention is the use of the melt flowable polytetrafluoroethylene as an additive to the melt-fabricable tetrafluoroethylene/perfluoro(alkyl vinyl ether) copolymer, wherein said perfluoroalkyl contains 1 to 5 carbon atoms, and then heat aging the resulting composition to obtain the physical property improvements and crystallographic changes individually or in combination as described above. Another embodiment of the present invention is the use of heat aging of the composition to obtain these improvements and/or changes as described above.

The present invention solves the problem of the physical property deterioration of melt fabricable tetrafluoroethylene/perfluoro(alkyl vinyl ether) copolymer, wherein said perfluoroalkyl contains 1 to 5 carbon atoms, with heat aging, leading to continuous service temperatures considerably less than the melting temperature of the copolymer. The solution to this problem resides in the embodiment wherein the process can be expressed as increasing the resistance of the copolymer to deterioration when heat-aged at a temperature greater than its 260° C. continuous use temperature, comprising incorporating melt flowable polytetrafluoroethylene into the copolymer, forming the resultant composition into an article, and heat aging this article at the temperature greater than the continuous use temperature of the copolymer, the amount of the polytetrafluoroethylene being incorporated into said composition being effective to prevent said deterioration as indicated by the composition retaining at least 80% of the tensile modulus of the composition prior to heat aging at the heat aging temperature, preferably at least 90%. The exposure of the composition to the high continuous use temperature is in effect a heat aging of the composition, including the article formed from the composition. The tensile modulus disclosed herein, including % increases or % retention, is measured at 23° C.±2° C. on heat-aged composition unless otherwise indicated.

For each of these embodiments, the heat aging time is preferably at least 4 hr and the heat aging temperature is at least within 30° C., preferably at least within 20° C. and more preferably at least within 10° C. of the melting temperature of the copolymer, with the proviso that the composition or article made therefrom is in the solid state. The present invention contemplates much longer heat aging times for compositions, e.g. at least 1 day, preferably at least 1 week, more preferably at least 2 weeks, and most preferably at least 6 months, at any of the heat-aging temperatures mentioned above The compositions used in the heat aging according to the present invention exhibit a single melting temperature as a result of epitaxial co-crystallization of the copolymer and the above-mentioned polytetrafluoroethylene components. The heat aging described herein while at temperatures above the continuous use temperature of the copolymer component is also at a temperature that is below the temperature at which the composition changes from the solid state to the molten state. Thus, at the heat-aging temperature and during heat aging the composition and the article made therefrom does not flow, but instead maintains its original shape.

One manifestation of the changes in crystallographic structure described above is improvement in tensile modulus of the composition. Other improvements such as in resistance to sagging and ballooning for tubing, reduced coefficient of friction and/or reduced permeability to gases are also obtained Thus, another embodiment of the present invention is the composition heat-aged at a temperature from 280° C. to less than the melting temperature of the composition, comprising melt-fabricable tetrafluoroethylene/perfluoro(alkyl vinyl ether) copolymer, the perfluoroalkyl containing 1 to 5 carbon atoms, and an effective amount of melt flowable polytetrafluoroethylene, to obtain (i) said heat-aged composition exhibiting a decrease in melt flow rate of at least 25% as compared to the melt flow rate of the composition prior to heat aging and/or (ii) said heat-aged composition retaining at least 80% of its tensile modulus at 23° C. In one aspect of this embodiment, this tensile modulus retention is present after at least 6 months heat aging at a temperature of at least 280° C. In another aspect, the heat aging is carried out at a higher temperature of at least 300° C. for at least 1 week, preferably for at least 2 weeks, more preferably, for at least 6 months.

Still another embodiment of the present invention is the heat-aged composition comprising melt-fabricable tetrafluoroethylene/perfluoro(alkyl vinyl ether) copolymer, the perfluoroalkyl containing 1 to 5 carbon atoms, and an effective amount of melt flowable polytetrafluoroethylene to provide said heat-aged composition with a crystal structure, characterized by an increase in crystallinity index (i) of at least 10% as compared to the crystallinity index of the composition prior to heat aging, and/or (ii) which is at least 10% greater than the % increase in crystallinity index for the copolymer by itself upon the same heat aging.

The structural change in the composition caused by heat aging can also be accompanied by one or more additional structural changes as described in Example 4. The heat-aged composition exhibits improved uniformity of the crystal structure, characterized by the composition exhibiting an increase in long period coherence that is at least 50% greater than the increase in long period coherence for the copolymer by itself upon the same heat aging, preferably at least 60% greater. The heat-aged composition has a crystal structure that includes lamellar stacks comprising crystalline and amorphous layers of the composition, and the amount of the polytetrafluoroethylene present in the composition is effective to increase the thickness of the crystalline layer, characterized by said composition exhibiting an increase in long period of at least 10% upon the heat aging.

The heat aging causing one or more of these structural (crystallographic) changes is heating carried out at a temperature of at least 280° C. for at least 4 hrs. The heat aging can be carried out for longer periods of time, e.g. at least 1 day, preferably at least 7 days and/or at higher temperatures, e.g. at least 300° C., but less than the melting temperature of the composition, i.e. the temperature that causes the composition or the article made therefrom to flow.

The foregoing-mentioned effects of the heat aging: tensile modulus, melt flow rate, and other structural changes, define individually or in combination the heat aged compositions of the present invention.

The polytetrafluoroethylene used in this composition is low molecular weight and will be referred to hereinafter as LMW PTFE. This LMW PTFE has no strength by itself, i.e., it cannot be molded into the test specimen needed for tensile property testing. Nevertheless, surprisingly, it imparts a strength retention quality to the copolymer when the composition is heated above its continuous use temperature. Thus, the presence of this LMW PTFE in the composition enables the article molded from the composition to be used for a long period of time at a temperature greater than the continuous use temperature of the copolymer component present in the composition. Preferably, the period of time of exposure of the article to the greater temperature is at least one week, preferably at least one month, and more preferably at least 6 months, and the greater temperature of the exposure is at least 20° C. greater than the continuous use temperature of the copolymer.

The ability for continuous use of the molded article at a greater temperature than for the copolymer by itself increases the applicability of the copolymer in high temperature environments such as are encountered in downhole wells for extraction of hot fluid, such as oil (liquid), gas, and/or steam from the earth, the chemical processing industry, and in the manufacture of semiconductors. In these fields of application, the heat to which the article is exposed is accompanied by hot fluid, typically a liquid in contact with the article. Either the hot fluid brings the heat to the article or a heating source brings the heat to the article from heated fluid in contact with the article. In any event, the hot fluid in such applications of the heat-aged composition can be other than air. The article may be supported as in the case of being in the form of a lining on a support substrate, or may be unsupported, i.e. free standing, as in the case of piping for the transportation of hot fluid.

DETAILED DESCRIPTION OF INVENTION

The tetrafluoroethylene/perfluoro(alkyl vinyl ether) copolymer used in the composition used in the present invention are those that are melt flowable so as to enable them to be melt fabricable. By melt fabricable is meant that the perfluoropolymer is sufficiently flowable in the molten state that it can be fabricated by melt processing such as extrusion, to produce products having sufficient strength so as to be useful. This sufficient strength may be characterized by the copolymer by itself exhibiting an MIT Flex Life of at least 1000 cycles, preferably at least 2000 cycles using 8 mil (0.21 mm) thick film. In the MIT Flex Life test, the film is gripped between jaws and is flexed back and forth over a 135° range. In this case, the strength of the copolymer is indicated by it not being brittle. The copolymer used in the present invention is a fluoroplastic, not a fluoroelastomer. As a fluoroplastic, the perfluoropolymer is semicrystalline, also called partially crystalline. The melt flow rate (MFR) of the copolymer is preferably (prior to any heat treatment) at least 0.1 g/10 min, preferably at least 5 g/10 min, more preferably at least 6 or 7 g/10 min and no greater than 50 g/10 min, as measured using the extrusion plastometer described ASTM D-1238 under the conditions disclosed in ASTM D 3307, namely at a melt temperature of 372° C. and under a load of 5 kg.

The copolymer as mentioned above is commonly referred to PFA, it being a copolymer of tetrafluoroethylene (TFE) and perfluoro(alkyl vinyl ether) (PAVE) in which the perfluoroalkyl group, linear or branched, contains 1 to 5 carbon atoms. Preferred PAVE monomers are those in which the perfluoroalkyl group contains 1, 2, 3 or 4 carbon atoms, respectively known as perfluoro(methyl vinyl ether) (PMVE), perfluoro (ethyl vinyl ether) (PEVE), perfluoro(propyl vinyl ether) (PPVE), and perfluoro(butyl vinyl ether) (PBVE). The copolymer can be made using several PAVE monomers, such as the TFE/perfluoro(methyl vinyl ether)/perfluoro(propyl vinyl ether) copolymer, sometimes called MFA by the manufacturer, but included as PFA herein. The PFA may contain about 1-15 wt % PAVE, although for a PAVE content of 2 to 5 wt %, preferably 3.0 to 4.8 wt %, is the most common PAVE content when a single PAVE monomer is used to form the PFA, the TFE forming the remainder of the copolymer. When PAVE includes PMVE, the composition is about 0.5-13 wt % perfluoro(methyl vinyl ether) and about 0.5 to 3 wt % PPVE, the remainder to total 100 wt % being TFE. Preferably, the identity and amount of PAVE present in the PFA is such that the melting temperature of the PFA is greater than 300° C. Examples of PFA are disclosed in U.S. Pat. No. 3,635,926 (Carlson) and U.S. Pat. No. 5,932,673 (Aten et al.).

With respect to the LMW PTFE used in the present invention, its melt flowability results from its low molecular weight. This is in contrast to PTFE, which is non-melt flowable in the molten state, arising from its extremely high molecular weight. While this low molecular weight imparts melt flowability to the LMW PTFE, this polymer by itself is not melt fabricable, i.e. an article molded from the melt of LMW PTFE is useless, by virtue of extreme brittleness. Because of its low molecular weight (relative to non-melt-flowable PTFE), it has no strength. An extruded filament of this low molecular weight (LMW) PTFE is so brittle that it breaks upon flexing. Generally, compression molded plaques cannot be made for tensile or flex testing of the LMW PTFE used in the present invention, because the plaques crack or crumble when removed from the compression mold, whereby neither the tensile property nor MIT Flex Life can be tested. In effect, this polymer has no (0) tensile strength and an MIT Flex Life of zero cycles.

The LMW PTFE can also be characterized by high crystallinity, preferably exhibiting a heat of crystallization of at least 50 J/g.

In addition to the LMW PTFE being characterized by its high crystallinity and lack of strength, the preferred LMW PTFE has melt flowability, which can be characterized by a melt flow rate (MFR) of at least 0.01 g/10 min, preferably at least 0.1 g/10 min and more preferably at least 5 g/10 min, and still more preferably at least 10 g/10 min, as measured in accordance with ASTM D 1238, at 372° C. using a 5 kg weight on the molten polymer.

The MFR of PFA and LMW PTFE used in the compositions from which the present invention is made are preferably within the ranges of 20 g/10 min from each other, preferably 15 g/10 min and more preferably 10 g/10 min from each other, determined in accordance with ASTM D 1238 at the melt temperature of 372° C. and under a 5 kg load. All melt flow rates disclosed herein are determined on unaged polymer unless otherwise indicated.

LMW PTFE is obtained by either direct polymerization under conditions that prevent very long polymer chains from forming, or by irradiation degradation of PTFE, i.e. the high molecular weight, non-melt flowable PTFE. While the LMW PTFE has low molecular weight, it nevertheless has sufficient molecular weight to be solid up to high temperatures, e.g. at least 300° C., more preferably at least 310° C., even more preferably, at least 320° C. Preferably, the LMW PTFE has a higher melting temperature than the melting temperature of the PFA, preferably at least 5° C. higher.

The LMW PTFE used in the present invention is frequently called PTFE micropowder, which is also another way of distinguishing this polymer from the high molecular weight, non-melt flowable PTFE. The trademark TEFLON® of the DuPont Company is well known as being applicable to PTFE. In contrast, the DuPont Company sells the PTFE micropowder as ZONYL® fluoroadditive to be used for imparting low surface energy and other fluoropolymer attributes when added to other materials.

The proportions of PFA and LMW PTFE used to make compositions that can be formed into articles capable of being used for sustained service at temperatures above the continuous use temperature of the PFA by itself will depend result desired, i.e., the proportion of LMW PTFE is effective to provide the physical property improvement and/or crystallographic change or any combination thereof as described above. In one embodiment, the amount of LMW PTFE to be used in the composition is that which is effective to increase the continuous use temperature of the PFA by itself to at least 280° C. Alternatively, this amount of LMW PTFE in the composition is that which is effective to increase the continuous use temperature from that of the PFA by itself to be within 20° C. of such melting temperature of the PFA by itself, preferably within 10° C. of such melting temperature, whereby the PFA/LMW PTFE composition would have a use temperature of at least 297° C. if the PFA melting temperature were 307° C. Most preferably, the continuous use temperature of the composition is at least 300° C. In this regard, the composition will generally contain at least 15 wt %, and preferably, at least 18 wt %, and more preferably at least 20 wt % of the LMW PTFE. The maximum amount of LMW PTFE will preferably be less than 50 wt %. For all the LMW PTFE minimum contents mentioned above, the more preferred maximum amount of LMW PTFE in the composition forming the component is 45 wt %, thereby defining LMW PTFE content ranges of 15 to 45 wt % and 18 to 45 wt %. On the same basis, the preferred maximum amount of LMW PTFE is 40 wt % and more preferably, 35 wt % and even more preferably 30 wt %, thereby defining such additional ranges as 18 to 40 wt %, 18 to 35 wt %, and 18 to 30 wt % and 20 to 45 wt %, 20 to 35 wt %, and 20 to 30 wt % LMW PTFE. For all these wt % amounts, the PFA constitutes the remaining polymer content to total 100 wt % based on the combined weight of these polymers. Preferably, a single LMW PTFE and a single PFA is used to form the heat-aged composition, and these are the only polymer ingredients making up the composition. Pigment may be present, that which does not render the composition electrically conductive. Preferably the dielectric constant of the composition is no greater than 2.4, more preferably, no greater than 2.2, determined at 20° C., enabling the composition and the article made therefrom to be electrically insulating, i.e. electrically non-conductive. In one aspect, the composition and article made therefrom is free of electrically conductive carbon.

The composition is preferably prepared by thorough melt mixing of the PFA and LMW PTFE together in the proportions desired. Melt-mixing as disclosed herein and as the term implies is the heating of the composition above the melting temperature of both components, and subjecting the resultant melt to mixing, such as by stirring the melt, as occurs using the injection or extrusion screw present in injection molding or extrusion, respectively. The shear rate used for the melt mixing will generally be at least about 75 s$^{-1}$. The melt mixability of the composition indicates that it is melt flowable, and the amount of PFA present in the composition is effective to also make it melt-fabricable Prior to melt mixing, the two polymers can be dry blended to form the composition as a dry blended mixture. The form of the polymers for dry blending can be extruded pellets of the PFA and LMW PTFE powder. Typically the pellets will be smaller than 10 mm in diameter and length, and the LMW PTFE powder will have an average particle size less than 50 micrometers as measured by laser Microtac® equipment.

Upon cooling the molten composition from the melt fabrication process, the PFA and LMW PTFE crystallize essentially separately as indicated by the composition exhibiting two melting temperatures corresponding to the melting temperatures of the two polymer components. The heat aging of the composition in the solid state as described above results in epitaxial co-crystallization, whereby the composition undergoes a transformation such that the composition exhibits only a single melting temperature. The heat-aged compositions are nevertheless referred to herein as comprising both polymer components of the composition or as incorporating LMW PTFE into the PFA in the belief that at the molecular level, these two components are present in the composition after heat aging. The term "comprising" used herein includes the description of the composition as to how it is made, i.e. the composition being made by combining two different polymers as described above, and the resultant composition, including the heat-aged composition. Articles made from of the resultant mixture are discussed in greater detail below.

The melt mixture of the composition can be melt-fabricated into the final form of articles desired for the composition or into extruded pellets of the composition, which can then be melt-fabricated into the final form of the article desired, which in the course of use can be exposed to temperatures greater than the continuous use temperature of the PFA contained in the composition as described above, i.e. greater than 260° C. The melt fabrication process will depend on the article being formed, but will generally use such melt fabrication processes as extrusion, injection molding, transfer molding, compression molding, rotolining or rotomolding.

From the foregoing, it is apparent that the compositions that are heat aged to form the heat-aged compositions of the present invention are first formed by melt mixing, followed by forming the melt mixture into an article that can be an intermediate, such as the pellet form, or can be the final shape of the article. Thus, the heat-aged compositions of the present invention can be defined as being made by melt mixing or as a heat-aged melt mixed composition or an article formed from such composition. The heat aging of the composition is preferably carried out on the melt mixture after it has been formed into an article, intermediate or final shape. Thus, in one aspect of the present invention, the heat aging is carried out on the intermediate article, which is then melt fabricated into the article's final shape, such as by extrusion or injection molding. Preferably, the heat aging is carried out on the final shape of the article because melt fabrication of the heat aged composition or article causes the composition to lose its epitaxial co-crystallization, (ECC) meaning that the article melt fabricated from the heat aged composition will have to be heat aged again to restore the ECC as described above. Such heat aging to cause the article to undergo ECC and/or other crystallographic changes as described above can therefore be a treatment resulting from the high temperature use of the composition in the form of the final shaped article.

Examples of final shape articles formed from the composition include linings for the following: vessels, chemical columns, pipe, fittings, pumps, and valves. In these applications, the lining is supported by the structure forming the equipment being lined. The article made from the composition can be unsupported, if made to have sufficient wall thickness or mass as to have the required integrity for the application. Instead of linings, the composition (article) can form the entire equipment. Additional articles can be heat exchanger tubes and other heat exchanger elements, such as tube sheet and/or housing, hoses and expansion joints, seals and gaskets. Self-supporting articles can be made, such as baskets and carriers used for example in semiconductor manufacture. The composition can be formed into primary and/or secondary electrical insulation for communications cable used in high temperature applications such as downhole wells for extraction of hot fluid, such as oil (liquid), gas, or steam from the earth and for high temperature-resistant motor windings for motors used is such high temperature application. In most of these applications, the heating (heat aging) of the article is done by the hot fluid coming into direct or proximate contact with the article.

The time of high temperature exposure of the article made from the composition used in the present invention will depend on the application. The composition is intended for effectiveness for at least one day, preferably at least 1 week, more preferably at least two weeks, and still more preferably at least 6 months exposure to the different high temperatures disclosed herein, which are greater than the continuous use temperature of the perfluoropolymer by itself. The PFA/LMW PTFE composition has been shown to withstand a temperature greater than 300° C. for at least 96 weeks without loss in tensile modulus. The time periods of heat aging or high temperature exposure disclosed herein, except for the heat aging disclosed in the Examples, can be the result of continuous or discontinuous exposure to the time/temperature of the heat aging. In the case of continuous exposure, the heat aging is uninterrupted. In the case of discontinuous exposure, the heat aging is interrupted, as may occur when the heat aged article is used in the depths of a downhole well and is periodically removed and re-installed in the well. Thus, the heat aging time is a cumulative time of exposure to heat aging whether continuous or discontinuous.

The process of the present invention can also be described as increasing the sustained high temperature applicability (continuous use temperature) of PFA, by (i) melt mixing melt flowable polytetrafluoroethylene with said PFA in an effective amount to obtain an increase in tensile modulus for the resultant composition as compared to the tensile modulus of said PFA by itself, (ii) melt fabricating said composition into an article, and (iii) exposing said article to heating above the continuous use temperature of said PFA (above 260° C.), said effective amount of said polytetrafluoroethylene retaining at least 80% of said modulus during said heating. The increase in tensile modulus imparted to the resultant composition is compared to the tensile modulus prior to the heating step. Preferably, the tensile modulus of the composition remains at least as high after said heating as the tensile modulus of the composition prior to the heating step. The modulus may increase upon said heating. The preferred tensile modulus retention is at least 90% of the original tensile modulus of the composition. The heating is preferably at a temperature of at least 280° C. The heating time is preferably at least 4 hr, more preferably at least 24 hr, and even more preferably, at least 7 days. The heating may be also be for at least 6 months in applications requiring continuous service at such high temperature. The heating temperature is preferably at least 280° C., which is considerably above the continuous service temperatures for PFA by itself. The above-mentioned heating time and temperature conditions are also applicable to the embodiments of the invention described below.

In another embodiment of the present invention, the process for increasing the continuous use temperature applicability of PFA, comprises (i) mixing melt flowable polytetrafluoroethylene with said PFA in an effective amount to obtain an increase in tensile modulus for the resultant composition as compared to the tensile modulus of said PFA by itself, (ii) fabricating said composition into an article, and (iii) subjecting said article to heating effective to obtain any of the improvements in physical properties and/or any of the changes in crystallographic structure as described above. In another embodiment, the heating is effective to increase said tensile modulus over that for said article prior to said heating.

Still another embodiment of the present invention is the process for the manufacture of a co-crystallized perfluoropolymer composition, comprising melting a mixture of tetrafluoroethylene/perfluoro(alkyl vinyl ether) copolymer, wherein the perfluoroalkyl contains 1 to 5 carbon atoms, with melt flowable polytetrafluoroethylene to form a composition, heat aging the composition at a temperature sufficient for said composition to have an apparent crystallite size of at least 280 Å, a long period of at least 280 Å, preferably at least 350 Å, a crystallinity index of at least 44, preferably at least 46, more preferably at least 48, and a long period coherence of at least 450 Å, preferably at least 500 Å, more preferably at least 550 Å. Alternatively, the composition is in the form of a melt-fabricated article and it is the article that is subjected to the heat aging. In either embodiment, the heat aging can be that which is effective for the composition/article to undergo ECC.

The mixing in these embodiments is preferably melt mixing, and the heating in these embodiments is preferably at a temperature of at least 280° C.

Another embodiment of the present invention is that the composition or article made therefrom is heat-aged at a temperature from 280° C. while in the solid state, the composition/article comprising melt-fabricable tetrafluoroethylene/perfluoro(alkyl vinyl ether) copolymer, wherein said perfluoroalkyl contains 1 to 5 carbon atoms, and an effective amount of melt flowable polytetrafluoroethylene to obtain (i) said heat-aged composition exhibiting a decrease in melt flow rate of at least 25% as compared to the melt flow rate of said composition prior to heat aging and/or (ii) said heat-aged composition retaining at least 80%, preferably at least 90%, of its tensile modulus at 23° C. after at least 6 months of said heat aging.

The performance of the heat aged composition of the present invention and the structural/chemical changes in the composition brought about by heat aging are described in the Examples below.

EXAMPLES

The tensile (Young's) modulus is determined by the procedure of ASTM D 638-03 as modified by ASTM D3307 section 9.6 on dumbbell-shaped test specimens 15 mm wide by 38 mm long and having a thickness of 5 mm, stamped out from 60 mil (1.5 mm) thick compression molded plaques. All tensile modulus values reported in these Examples are measured at 23° C.±2° C. unless otherwise specified therein.

The procedure for measuring MIT Flex Life is disclosed in ASTM D 2176 using an 8 mil (0.21 mm) thick compression molded film.

The compression molding of the plaques and film used in these tests was carried out on melt-blended compositions made in the Brabender® extruder as described later herein under a force of 20,000 lbs (9070 kg) at a temperature of 343° C. to make 7×7 in (17.8×17.8 cm) compression moldings. In greater detail, to make the 60 mil (1.5 mm) thick plaque, 80 g of the composition is added to a chase which is 63 mil (1.6 mm) thick. The chase defines the 17.8×17.8 cm plaque size. To avoid sticking to the platens of the compression molding press, the chase and composition filling are sandwiched between two sheets of aluminum. The combination of the chase and the aluminum sheets (backed up by the platens of the press) form the mold. The press platens are heated to 343° C. The total press time is 10 min, with the first one minute being used to gradually reach the press force of 20,000 lb (9070 kg) and the last minute being used for pressure release. The sandwich is then immediately transferred to a 70-ton (63560 kg) cold press, and a force of 20,000 lb (9070 kg) is applied to the hot compression molding for 5 min. The sandwich is then removed from the cold press and the compression molded plaque is removed from the mold. The dumbbell test specimens (samples) are die cut from the plaque using the steel die described in FIG. 1 of ASTM D 3307. The film used in the MIT test used the same procedure except that the chase is 8 mil (0.21 mm) thick and the amount of composition added to the mold is 11.25 g. The film samples used in the MIT test were ½ in (1.27 cm) wide strips cut from the compression molded film.

The LMW PTFE used in the Examples are as follows:

LMW PTFE A has a heat of crystallization of 64 J/g, melting temperature of 325° C. (second heat) and average particle size of 12 micrometers, and MFR of 17.9 g/10 min.

LMW PTFE B has a heat of crystallization of 59 J/g, melting temperature of 330° C. (second heat), average particle size of 20 micrometers and MFR of 0.01 g/10 min.

Neither of these LMW PTFEs could be compression molded into plaques that had sufficient integrity for tensile property testing.

The PFAs used in the Examples are as follows:

PFA 1 is a TFE/PPVE copolymer having an MFR of 14 g/10 min.

PFA 2 is a TFE/PPVE copolymer having an MFR of 2 g/10 min.

PFA 3 is a TFE/PPVE copolymer having an MFR of 5.2 g/10 min.

PFA 4 is fluorine treated PFA 1 having no more than 20 unstable end groups (—COF and —COOH) per $10^6$ carbon atoms in the polymer chain.

All of these PFAs have a melting temperature (first heat) of 307-308° C. and contain 3.2 to 4.8 wt % PPVE. The end group population of the non-fluorine-treated PFAs 1-3 is mainly —COOH and a small proportion of the total end groups being —COF, i.e. the PFAs are not fluorine treated.

The PFA used in the Examples is in the form of pellets obtained by extrusion of the PFA and cutting of the extruded strand into the pellets.

The procedure for determining melting temperatures disclosed herein is by DSC (differential scanning calorimeter) analysis in accordance with ASTM D3418-08. The calorimeter used is TA Instruments (New Castle, Del., USA) Q1000 model. The temperature scale has been calibrated using (a) 3 metal melting onsets: mercury (−38.86° C.), indium (156.61° C.), tin (231.93° C.) and (b) the 10°/min heating rate and 30 ml/min dry nitrogen flow rate. The calorimetric scale has been calibrated using the heat of fusion of indium (28.42 J/g) and the (b) conditions. The melting temperature determinations are carried out using the (b) conditions. The melting temperatures disclosed herein are the endothermic peak melting temperature obtained from the first or second heating (melting) of the polymer following the heat-up/cool-down/heat-up schedule set forth in U.S. Pat. No. 5,603,999, except that the highest temperature used in 350° C. For the PFA, and the PFA/LMW PTFE compositions described herein, the melting temperature is from the first heat. For the LMW PTFE, the melting temperatures described herein are for the second heat.

Heat of crystallization (first heat) is determined as disclosed in U.S. Pat. No. 5,603,999.

Dynamic mechanical analysis is conducted isothermally using a TA Instrument Model Q800. This equipment measures mechanical (viscoelastic) properties by applying sinusoidal stress to the test sample and monitoring the strain and phase lags between 0 and 90°. This test measures the modulus and energy dissipation of the test samples under the periodic sinusoidal stress. The test samples are compression molded bars measuring 12.8 to 13.2 mm in length, 2-6 to 2.7 mm in thickness. The clamp mode in the equipment is dual cantilever bending, using a 10-in-lb clamping torque force and oscillation amplitude of 10 micrometers and frequency of 1 Hz.

The blends (melt mixtures) of PFA and LMW PTFE used in the Examples are obtained by the following procedure: A Brabender® single screw extruder is used. The extruder is equipped with a 1¼ in (3.2 cm) diameter screw having a Saxton-type mixing tip and the extruder has an L/D ratio of 20:1. Pellets of the PFA and LMW PTFE powder are dry blended, followed by melt mixing in the Brabender® extruder. For the 30 wt % LMW PTFE content composition, the blending is in three steps. In the first step, one-third of the desired total amount of the LMW PTFE is mixed with the perfluoropolymer pellets and then passed through the extruder, which extrudes pellets of this mixture. In the second step, these pellets are dry mixed with the another one third of the desired total amount of LMW PTFE and passed through the Brabender extruder to produce extruded pellets. The third step is dry blending of these pellets with the final one third of the LMW PTFE and then passing this composition through the extruder to obtain well-mixed PFA/LMW PTFE blend in the form of pellets. For the 20 wt % LMW PTFE/PFA composition, only the first two passes through the extruder are carried out. The temperature profile in the extruder is as follows: zone 1=315° C., zone 2=321 ° C., zone 3=332° C., zone 4=338° C., zone 5 and die=349° C. The extruder screw is operated at 120 rpm.

In the Examples, the heat-aged compositions and test specimens made therefrom are in the solid state during heat aging, unless otherwise specified.

Example 1

Compositions Withstanding Heat Aging at 315° C.

The Example shows the increase in tensile modulus for blends of PFA with LMW PTFE resulting from no-load heat aging at 315° C. in a circulating air oven of test specimens made of compositions reported in Table 1. This heat aging temperature is greater than the aging temperature used for determining suitability for service in downhole wells, such as electrical insulation for either data cable or power cable positioned within the depth of the well, wherein exposure to a temperature as high as 300° C. can be encountered. The same is true for linings for equipment used for semi-conductor manufacture and in the chemical process industry.

TABLE 1

|  | Tensile Modulus-MPa | | | | |
| --- | --- | --- | --- | --- | --- |
| Weeks | PFA 2/ B-20 | PFA 2/ A-20 | PFA 3/ A-20 | PFA 4/ A-20 | PFA 1/ A-30 |
| 0 | 437 | 465 | 484 | 487 | 541 |
| 3 | 477 | 485 | 489 | 469 | 508 |
| 6 | 500 | 518 | 506 | 503 | 551 |
| 9 | 497 | 520 | 494 | 497 | 591 |
| 12 | 502 | 529 | 528 | 542 | 602 |

In Table 1, the "Weeks" column represents the heat aging time for the tensile modulus test specimen at 315° C. In the column heading "PFA 2/B-20", B is 20 wt % LMW PTFE B in the composition. The remaining column headings and similar column headings in Tables presented below are to be similarly interpreted, e.g. "A-30" is 30 wt % LMW PTFE A. Test specimens are removed from the oven each week and tested for tensile modulus at 23° C. For brevity, only the results for three week intervals are reported in Table 1. Each test specimen is tested for tensile modulus only once and then is discarded, whereby each tensile modulus test result is on a new test specimen.

The tensile modulus test results shown in Table 1 reveal that the trend for tensile modulus is to increase with increasing aging time in weeks. The omitted tensile test results for weeks 1, 2, 4, 5, 7, 8, 10, and 11 agree with this trend. This is contrary to the expectation of diminishing tensile property with aging time leading to the establishment of 260° C. as the continuous use temperature for PFA by itself. Surprisingly the presence of the substantial amount of LMW PTFE in the PFA composition provides this heat aging improvement of obtaining at least 80%, preferably at least 90% of the original (prior to heat aging) tensile modulus, notwithstanding that the LMW PTFE has no tensile property by itself.

Tensile modulus testing of the composition PFA1/LMW PTFE A-20 after aging for long periods of time reveals a similar retention of tensile modulus, wherein the trend is increasing tensile modulus with increased aging time at 315° C. as shown in the following Table:

TABLE 2

| Weeks | Tensile Modulus-MPa |
| --- | --- |
| 0 | 487 |
| 5 | 479 |
| 10 | 507 |
| 15 | 535 |
| 20 | 576 |

The omitted tensile test results for weeks 1-4, 6-9, 11-14, and 16-19 and 11 agree with this trend of (a) retention of tensile modulus and/or (b) increase in tensile modulus with increasing aging time. This trend has been observed with additional aging to 6 months and longer. For example, the tensile modulus tested at 23° C. remains within 90% of the original tensile modulus after 18 mos. of heat aging at 315° C. The same is true for the composition PFA3/LMW PTFE A-20.

When the LMW PTFE concentration in the PFA is reduced to 15 wt % under this heat aging condition, the test specimens become unsuitable for testing due to distortion while heat aging in the oven for just one week. This means that the heat aging temperature must be reduced, e.g. to 300° C., to obtain a service temperature suitability of about 285° C.

All of the PFA/LMW PTFE compositions used in this Example, exhibit two melting temperatures before heat aging and a single melt temperature after heat aging, the single melting temperature being within the range of 318 to 324° C., and a dielectric constant of less than 2.2, these being the preferred properties for the heat-aged compositions of and used in the present invention.

Example 2

Dynamic Mechanical Analysis (DMA)—Storage Modulus at 300° C.

DMA is determined by the procedure and using the equipment described above. After heat aging for seven days at 315° C., the storage modulus (E') is measured at 300° C. on PFA 1 by itself and on the composition of PFA 1/LMW PTFE A-20. E' for the PFA 1 by itself is 19.1 MPa. E' for the composition is 27.7 MPa, an increase of 40% over the PFA by itself.

Example 3

Tensile Modulus of PFA/LMW PTFE at Elevated Temperature after Heat Aging

While tensile testing at ambient temperature is relied upon for determining continuous use temperature, it is also desirable to know the tensile property at a high temperature after heat aging.

When the PFA/LMW PTFE composition is subjected to heat aging at 315° C. for 7 days and tensile tested at 250° C., the composition still exhibits significant tensile modulus as shown in Table 3.

TABLE 3

| Test Temp. - °C. | Tensile Modulus (MPa) PFA 1/A-20 |
| --- | --- |
| 23 | 540 |
| 250 | 25 |

When the heat aging of the PFA 1/A-20 composition is done at this temperature/time condition and tested for tensile modulus at 200° C., the results reported in Table 4 are obtained.

TABLE 4

| Heat aging time (hr) | Tensile Modulus - (MPa) |
| --- | --- |
| 0 | 50 |
| 24 | 56 |
| 48 | 56 |
| 168 | 56 |

Example 4

Structural Changes in the PFA/LMW PTFE Composition Caused by Heat Aging

Heat aging of the PFA/LMW PTFE composition causes the composition to change in structure.

One manifestation of this structural change is that the first heat melting temperature of the composition increases as reported in Table 5 for composition PFA 1/LMW PTFE A.

TABLE 5

| Amount of A | Heat Aging | | DSC Melting |
| --- | --- | --- | --- |
| (Wt %) | Time (hr) | Temp. (° C.) | Temp. (° C.) |
| 20 | 48 | 300 | 318 |
| 20 | 48 | 315 | 324 |
| 20 | 48 | 320 | 325 |
| 30 | 48 | 300 | 320 |
| 30 | 48 | 315 | 324 |
| 30 | 48 | 320 | 325 |

The melting temperature of the PFA by itself is 307° C. and of the LMW PTFE A by itself is 325° C.

Another manifestation of structural or chemical change within the heat aged composition is that it exhibits an increase in melt viscosity, i.e. when the composition is melted, it exhibits decreased melt flowability, e.g., as reported in Table 6 for composition PFA 1/LMW PTFE A-20 heat aged at 300° C. and at 315° C.

TABLE 6

| Heat Aging Time (days) | MFR (g/10 min) | |
| --- | --- | --- |
|  | 300° C. | 315° C. |
| 0 | 14 | 14 |
| 1 | 9.8 | 6 |
| 2 | 8 | 1.7 |
| 3 | 6.8 | 1.1 |
| 4 | 5.9 | 1.1 |
| 5. | 3.6 | 1 |
| 6 | 2.8 | 1 |
| 7 | 2 | 1 |

The MFR of the composition decreases with increased heat aging. The decrease is much greater for the composition heat aged at 315° C. In addition, the effect of the heat aging of the composition at 315° C. in the first 2 days is much greater than for the 300° C. heat-aged composition, i.e. the drop is much sharper. Thereafter the MFR for the 315° C. heat-aged composition tends to level out with increasing exposure time, while the 300° C. heat-aged composition continues its more gradual decrease in MFR with increasing exposure time.

Additional manifestations of structural change is revealed by X-ray analysis (small and wide angle x-ray scattering, SAXS and WAXS), i.e. changes in crystallinity index, apparent crystallite size, long period, and long period coherence. The composition after melt mixing is typical of a semi-crystalline polymer in which crystalline material is either dispersed within an amorphous continuous phase (layers) or is present as crystalline layers within the stacks, which consist of alternating crystalline and amorphous layers. WAXS provides a measure of the crystallinity of the composition in the form of an index, which is proportional to the volume fraction of crystalline material. This technique also provides a measure of the apparent crystallite size. SAXS provides a measure of the long period, which is the sum of the crystalline plus amorphous repeat layers in the lamellar stacks. SAXS also provides a measure of the perfection of these stacks (long period homogeneity/uniformity, total stack length, stacking faults), which is referred to as long period coherence. Long period coherence is simply a determination of the perfection of the crystal structure.

Crystallinity Index—The crystallinity index for the composition PFA 1/LMW PTFE A-20 is 41 unaged and 51 after aging at 300° C. for 4 hr, an increase of 24% (calculation (51-41)/41×100). The composition PFA 2/LMW PTFE A-20 exhibits the same crystallinity indexes, unaged and aged. In contrast, the PFA 1 by itself exhibits crystallinity indexes before and after the same aging of 37 and 43, respectively, which is an increase of only 16%. The PFA 2 exhibits a smaller change in crystallinity index, increasing from 37 to 42 upon the same heat aging.

Apparent crystallite size—The apparent crystallite size measured increases with heat aging (300° C. for 4 hr) as reported in Table 7.

TABLE 7

| PFA | LMW PTFE | Apparent Crystallite Size (Å) | | % Increase |
| --- | --- | --- | --- | --- |
|  |  | Unaged | Heat Aged |  |
| 1 | — | 213 | 271 | 27 |
| 1 | A-20* | 229 | 289 | 26 |
| 2 | — | 218 | 271 | 24 |
| 2 | A-20* | 249 | 280 | 12 |

*A-20 means the composition contains 20 wt % of the LMW PTFE A, the remainder to total 100% being the PFA. As shown in Table 7, the apparent crystallite size of the compositions increases with heat aging.

The increase in crystallite size resulting from heat aging is in contrast to the reduced spherulite size occurring when LMW PTFE is added to PFA as disclosed in U.S. Pat. No. 5,473,018 (Namura and Nishio). Spherulite sizes are measured in micrometers (Recrystallized Average Spherulite Diameter). These spherulites are made up of a multitude of polymer crystals, wherein the crystallite size is measured in angstroms. One micrometer=10,000 angstroms.

Long period—The PFA 1/LMW PTFE A-20 composition exhibits an increase in long period from 292 Å to 390 Å after aging at 300° C. for 4 hr. The long period for the same-aged PFA 1 by itself is 350 Å. Thus, the presence of the LMW PTFE in the heat-aged composition produces a thicker crystalline layer than is produced by the PFA 1 by itself upon heat aging.

Long period coherence—Determination of long period coherence for PFA/LMW PTFE composition and the PFA by itself is reported in Table 8.

TABLE 8

| PFA | LMW PTFE | Long Period Coherence (Å) | |
| --- | --- | --- | --- |
| (wt %) | (wt %) | Unaged | Aged (300° C./4 hr) |
| 100 | — | 295 | 439 |
| 80 | 20 | 361 | 633 |

In Table 8, the PFA is PFA 1 and the LMW PTFE is A.

The presence of the LMW PTFE in the composition results in a greater perfection of the lamellar crystal structure as compared to the PFA by itself. This increase in perfection is enhanced by the heat aging, i.e. the increase in long period coherence for the composition is 80% as compared to 49% for the heat-aged PFA by itself.

From the foregoing, the heat aging of the PFA/LMW PTFE composition results in unexpected changes in crystal structure as compared to the unaged composition and/or the heat-aged PFA by itself, as follows: increase in amount of crystallinity, increase in crystallite thickness and perfection. The increase in crystallinity and the increase in long period (thickness of the crystalline layer plus thickness of the amorphous layer) suggests that the heat aging increases the thickness of the crystalline layer.

The determination of these SAXS parameters is known by the skilled X-ray analyst for polymers. Crystallinity index is determined from the equation (15b) $X_k = a \cdot [C_3/(C_3+C_4)] + b$, wherein $X_k$ is the crystallinity index, a=1 and b=0, and C3 and C4 are integrals under the crystalline and amorphous peaks, as disclosed in R. Scigala and A. Wlochowicz, "Crystallinity of poly(tetrafluoroethylene)", Acta Polymerica 40 (1989) Nr. 1. The assignment of 1 and 0 values for a and b, respectively in the equation is a simplification based on the values of a and b reported in Table 1 of the publication. Apparent crystallite size is calculated from the width of the crystalline Bragg peak according to the Scherrer equation with K=1 as disclosed in "X-ray Diffraction Procedures for Polycrystalline and Amorphous Materials", H. P. Klug, L. E Alexander published by John Wiley (1954). Long period is determined in accordance with the disclosure in I. Ferry et al., "Study of polytetrafluoroethylene crystallization", Acta Polymerica, 46, 300-306 (1995), VCH Verlagsgesellschaft mbH. In greater detail, a linear baseline is drawn under the long period peak in $Q^2I(q)$ plot vs. Q as described on p. 303 of this publication. After baseline subtraction, the resultant peak is analyzed to extract the position and intensity of the peak maximum and the peak width. Long period is calculated from the peak position and Bragg's Law (section 6.2, p. 303 of the Ferry et al. publication). Long period coherence is calculated from the Scherrer equation and the peak width. The narrower the peak width, the greater is the perfection of the crystal structure.

Example 5

Non-Sagging Tubing

Heat aging of the compositions provides higher continuous use temperature, but also provides for improvements at lower temperature. One example of such improvement is improved resistance to sagging such as is experienced for tubing made of the composition. The expression "tubing" used herein includes pipe. Tubing used for conveying fluid, gas or liquid, in the chemical process industries is subjected to internal pressure from the fluid being transported by the tubing, which tends to diametrically expand (balloon) the tubing. The tubing may also sag between supports. Either of these disadvantageous effects can be addressed by the added expense of reducing the spacing between supports and/or using heavier tubing wall thickness. The forces causing ballooning and sagging can exist at ambient and higher temperature operation. An increase in tensile modulus exhibited by the tubing when heat aged in accordance with the present invention contributes to increased resistance to the sagging and/or ballooning force when the tubing is used at lower temperatures. Such tubing therefore becomes more resistant to diametrical expansion and sagging between supports. Thus, for given tubing dimensions and support structure, the tubing provides a more stable piping system. Alternatively, the original system stability can be achieved with lighter weight (thinner wall) tubing and/or fewer supports.

Example 6

Reduced Permeability to Gases

Another example of the lower temperature benefit resulting from heat aging the composition in accordance with the present invention is that such heat aging reduces the permeability of the composition to gases. This is demonstrated below using MOCON® testing equipment for measuring transmission of the gas through a film of the composition. The composition used in this Example is 75/25 wt % PFA 3/LMW PTFE A. The composition is formed into a film for the gas transmission test. The heat aging of the film is carried out at 300° C. for different periods of time and the gas transmission test is carried out at ambient temperature. Results of this test are reported in Table 9. The gas transmission results reported below are in units of cc-mil/[$m^2$-day], this being the permeation rate.

TABLE 9

| | $CO_2$ Transmission | |
|---|---|---|
| Heat aging | film thickness (mil) | Permeation Rate |
| None | 1.69 | 28775 |
| 1 day | 1.83 | 12721 |
| 3 days | 1.61 | 11979 |
| 21 days | 1.60 | 9277 |

TABLE 10

| | $O_2$ Transmission | |
|---|---|---|
| Heat aging | film thickness (mil) | Permeation Rate |
| None | 1.60 | 14617 |
| 1 day | 1.66 | 6629 |
| 21 days | 1.55 | 6881 |

From Tables 9 and 10 it is apparent that after just 1 day of heat aging, the transmission of the gases is reduced more than 50%, and in particular, the reduction is about 55%. The use of such high temperature heat aging to obtain this reduction in permeability to gas is unknown in the prior art.

The above gases are inorganic gases. The heat aging also produces a substantial reduction in permeation by organic gases such as methane, from about 34000 to about 21000 cc-mil/[$m^2$-day], after heat aging the film for 3 days at 300° C.

This embodiment represents the use of the heat aging process to reduce permeability to gas. The process may be described as heat aging of a composition, preferably in the form of a film, to reduce the permeation to gas by at least 25%, preferably by at least 30%, more preferably by at least 35%, and most preferably by at least 50%. The composition can be any of those described above. A preferred embodiment is the heat-aged film obtained from this process.

Example 7

Reduced Coefficient of Friction

Still another example of the lower temperature benefit resulting from heat aging the composition in accordance with the present invention is that such heat aging reduces the coefficient of friction of the composition by at least 25%, again another effect that is unknown in the prior art. The composition PFA 1/LMW PTFE A-20 exhibits a static coefficient of friction of 0.05. After heat aging at 315° C. for 14 days, this coefficient of friction is reduced to 0.03, which is equivalent to that of TEFLON® 7A polytetrafluoroethylene molding powder. The effect of the heat aging is to reduce this coefficient of friction by 40% to be the same as the coefficient of friction of non-melt fabricable, non-melt flowable PTFE. The advantage of using the composition and heat aging it in accordance with the present invention is that the composition is melt fabricable into the shape of the article desired, which is not possible with the non-melt fabricable, non-melt flowable PTFE represented by TEFLON® 7A polytetrafluoroethylene molding powder These coefficient of friction measurements are carried out in accordance with ASTM D 1894, using a 193 g load.

This embodiment represents the use of heat aging to decrease the coefficient of friction of the article made from the composition used in the present invention. The process may be described as heat aging of the composition to reduce its coefficient of friction, preferably the static coefficient of friction, by at least 25%, preferably by at least 30%, more preferably by at least 35%. The composition can be any of those described above. A preferred embodiment is the heat aged article of the composition exhibiting this improvement in static coefficient of friction.

Example 8

This Example shows that heat aging is required to produce epitaxial co-crystallization. Melt extrusion of the composition does not produce this effect, i.e. . . . the composition exhibits two melting temperatures corresponding approximately to that of the PFA and LMW PTFE components. The composition tested in this Example is 75 wt % PFA3 and 25 wt % LMW PTFE A. The starting material is this composition in the form of pellets prepared using the Brabender® single screw extruder as described above.

DSC analysis of the pellets reveals the presence of two endothermic peaks at approximately 315° C. and 322° C., indicating the presence of separate crystals primarily of the PFA and LMW PTFE being present in the pellets of the composition.

Re-extrusion of the pellets through a Kombiplast® extruder having a screw design for thorough melt blending of the components of the composition and DSC analysis of the extrudate reveals approximately the same two melting temperatures (312° C. and 320° C.) for the unaged composition.

Heat aging of the extrudate for 1 day at 300° C. followed by DSC analysis reveals a single melting temperature for the composition, 319° C. It has been determined that at least about 12 hr heat aging at 300° C. is required before an essentially single melting temperature is exhibited by the composition.

The re-extrusion of the unaged composition is repeated 6 times and the resultant unaged extrudate for each extrusion is subjected to DSC analysis, the result being the presence of two melting peaks within the range of 313° C.-314° C. and 321° C.-322° C.

Heat aging at 300° C. for 1 day of the unaged extrudate from each of these 6 re-extrusions reveals a single DSC melting peak (melting temperature) within the range of 318° C. to 319° C.

The extrudate remains solid and the shape of the extrudate remains discernible even after this heat aging, i.e. this heat aging is carried out with the extrudate being in the solid state.

Thus, it is apparent that that heat aging for a considerable period of time at a high temperature is required for ECC to occur.

The invention claimed is:

1. Heat-aged composition comprising melt-fabricable tetrafluoroethylene/perfluoro(alkyl vinyl ether) copolymer, wherein said perfluoroalkyl contains 1 to 5 carbon atoms, and melt flowable polytetrafluoroethylene, the heat aging of said heat aged composition being carried out at a temperature greater than 260° C. with said composition being in the solid state, said heat aged composition exhibiting one or more of the following:
    (a) a continuous use temperature of at least 300° C.,
    (b) a reduced coefficient of friction,
    (c) a reduced permeation to gases by at least 50%,
    (d) a decrease in melt flow rate of at least 25% as compared to the melt flow rate of said composition prior to heat aging,
    (e) an increase of at least 30% in storage modulus at 300° C.
    (f) an increase in thickness of its crystalline layer characterized by an increase in long period of at least 25%,
    (g) an increased resistance to sagging and/or ballooning,
    (h) an increase in crystallinity index by at least 10%,
    (i) improvement in uniformity of crystal structure characterized by an increase in long period coherence of at least 10%,
    (j) an increase in thickness of crystalline layer characterized by an increase in long period of at least 25%,
    (k) epitaxial co-crystallization.

2. The heat-aged composition of claim 1 in the form of electrical insulation, lining, heat exchanger elements, including tubes, self-supporting articles, including baskets and carriers, and tubing.

3. Heat-aged composition comprising melt-fabricable tetrafluoroethylene/perfluoro(alkyl vinyl ether) copolymer, wherein said perfluoroalkyl contains 1 to 5 carbon atoms, and an effective amount of melt flowable polytetrafluoroethylene to provide said heat aged composition with a crystal structure, characterized by one or more of the following: an increase in crystallinity index (i) of at least 10% as compared to said heat-aged composition prior to heat aging, and/or (ii) of at least 10% greater than the % increase in crystallinity index for said copolymer by itself upon said heat aging, wherein the heat aging of said heat aged composition is carried out at a temperature greater than 260° C. with said composition being in the solid state.

4. The heat aged composition of claim 3 exhibiting one or more of the following:
    (i) uniformity of said crystal structure that is improved by said heat aging, characterized by said heat-aged composition exhibiting an increase in long period coherence that is at least 10% greater than the increase in long period coherence for said copolymer by itself upon said heat aging,
    (ii) said crystal structure including lamellae comprising a crystalline layer of said heat-aged composition and an amorphous layer of said heat-aged composition, and the amount of said polytetrafluoroethylene is effective to increase the thickness of said crystalline layer, characterized by said heat-aged composition exhibiting an increase in long period of at least 25% upon said heat aging,
    (iii) an apparent crystallite size of at least 280 angstroms, a crystallinity index of at least 44, a long period of at least 375 angstroms and a long period coherence of at least 450 angstroms, and
    (iv) a 300° C. storage modulus that is at least 30% greater than the 300° C. storage modulus of said tetrafluoroethylene/perfluoro(alkyl vinyl ether) copolymer by itself after said heat aging is at 315° C. for 7 days.

* * * * *